United States Patent [19]
Johannes

[11] 3,899,601
[45] Aug. 12, 1975

[54] DRY MIX FOR GLAZED CAKE

[75] Inventor: James H. Johannes, Minneapolis, Minn.

[73] Assignee: General Mills, Inc., Minneapolis, Minn.

[22] Filed: Dec. 3, 1973

[21] Appl. No.: 420,821

[52] U.S. Cl. ............................................. 426/554
[51] Int. Cl. ........................................... A21d 13/00
[58] Field of Search ............ 426/152, 155, 156, 343

[56] References Cited
UNITED STATES PATENTS

| | | |
|---|---|---|
| 2,710,809 | 6/1955 | Andrews et al. ................ 426/156 X |
| 3,367,781 | 2/1968 | Cooke ................................ 426/152 |
| 3,676,152 | 2/1972 | Edwards et al. .................... 426/152 |

*Primary Examiner*—Raymond N. Jones
*Attorney, Agent, or Firm*—Gene O. Enockson; Elizabeth Tweedy

[57] ABSTRACT

A dry cake mix which upon rehydrating the batter does not absorb glazing mixtures and, therefore, can be glazed while baking.

6 Claims, No Drawings

DRY MIX FOR GLAZED CAKE

This invention relates to a dry cake mix which upon rehydration is capable of being glazed during baking. More particularly, the invention relates to a dry cake mix which when rehydrated can be poured on top of a fluid glaze mixture in a pan. When the combination is baked and removed from the pan, the resulting cake will be glazed.

Heretofore, cakes have been glazed by first baking a cake. A glaze mixture was then boiled and poured over the cooled cake, and the glaze was allowed to cool and solidify. This method of glazing from the point of removing the cake from the oven to the final hardening of the glaze required about an hour.

It has now been found that cake batters, made from the dry cake mix of this invention, can be poured over a warm fluid glaze mix without absorbing the glaze mixture to the point that the glaze loses its identity as a glaze. To practice this invention, a warm fluid glaze mixture can be made by dissolving sugar in water and adding melted butter. The warm fluid mixture is poured onto the bottom of a cake pan. The cake batter of this invention is then poured over the warm fluid glaze mixture. The combination is baked. During baking the cake batter is converted into a cake and the glaze mixture is cooked. The glaze adheres to the cake adjacent to the bottom of the pan. The final product taken from the baking pan is a glazed cake, the glaze being on the surface of the cake having the contours of the baking pan.

The dry cake mix of this invention consists essentially of:
- about 22% to 30% wheat flour by weight of the dry cake mix composition,
- about 40% to 50% sucrose by weight of the dry cake mix composition,
- about 1% to 9% starch by weight of the dry cake mix composition, said starch being wheat or corn starch,
- about 18% to 21% plastic shortening by weight of the dry cake mix composition, and
- about 1% to 2% by weight slow acting baking powder blend.

The flour which is useful in the practice of this invention is wheat flour having a protein level of from about 8 to 10% by weight of the flour. Traditional cake flour has about 8% protein by weight of the flour. Pastry flour ordinarily has a protein level of about 10% by weight of the flour. Other wheat flours such as bread flour generally have protein levels above 10% by weight. The preferred protein range for the wheat flour useful in this invention is between about 9 and 10% by weight of the flour. This protein range permits easy removal of the cake from the pan.

The sucrose useful in the practice of this invention can have a granulation ranging from the powdered sugar to regular granulated sugar and combinations thereof.

The starch useful in the practice of the invention can be wheat starch or corn starch. The starch can be non-gelatinous or gelatinized. When non-gelatinized starch is used, the preferred amount is between about 2 to 9% by weight of the dry cake mix composition. When gelatinized starch is used, the preferred amount is between about 1 to 2% by weight of the dry cake mix composition.

The shortening useful in the practice of the invention is plastic shortening having solid fat index of about

| Temperature, °F. | SFI, % |
|---|---|
| 50 | 29–33 |
| 70 | 21–24 |
| 80 | 19–22 |
| 92 | 14–17 |
| 104 | 8–10 |

The shortening level in the cake mixes of the present invention are substantially higher than the levels found in traditional cake mixes. The shortening can be derived from animal or vegetable sources or a combination thereof. The properties of shortening are critical to the usefulness of the present dry cake mix composition. In order to maintain the storage stability of the dry cake mix free oil at storage temperatures must be avoided. On the other hand, the shortening must be plastic at room temperature in order to permit preparation of a uniform dry mix, thus making the dry cake mix free flowing and lump free.

The baking powder is preferably a slow reacting baking powder. Such baking powders typically include, along with soda, acids such as sodium aluminum phosphate, anhydrous monocalcium phosphate, monocalcium pyrophosphate and mixtures thereof.

To the above basic ingredients, seasonings and flavors can be added as desired. Non-fat milk solids can be used to enrich the final cake and will also contribute some binding functions. Non-fat milk solids can be included up to about 6% of the dry mix composition. These functions are also obtainable by adding cocoa. Cocoa can be included up to about 10% by weight of the dry cake mix composition. These ingredients, however, are not essential. When ingredients such as non-fat milk solids and cocoa are included, they should be calculated as additions to the total dry cake mix composition. The proportions of the ingredients of the dry cake mix composition remain the same in respect to each other.

The dry cake mix composition can be prepared by dry blending the dry ingredients and extruding the shortening into the dry blend and mixing until uniform distribution of the shortening is attained.

The resulting dry cake mix can be rehydrated to form a cake batter by adding eggs and water and hand mixing the mixture. Best results are obtained when from about 50 ml. to 160 ml. of water are used with 369 grams of the dry cake mix. The amount of 369 grams is an amount usually used to produce cake of about nine inch diameter.

A glaze mixture useful in the practice of this invention can be made by melting about 50 to 70 grams (about 2 tablespoons) of butter in about 45 to 75 grams of hot tap water. To this mixture is added about 85 to 105 grams of sucrose and the mixture stirred to dissolve the sucrose.

The glaze mixture can be prepared in the baking pan or alternatively can be prepared in a separate pan and poured into the baking pan. The rehydrated dry cake mix is poured over the glaze mixture and the baking pan placed in the oven. The cake is then preferably baked for a period of about 25 to 40 minutes at a temperature of about 325° to 350°F. The baking conditions can vary substantially from the preferred conditions under actual bakery practice. After baking, the pan can be inverted immediately and is ready to serve in about fifteen minutes.

Below are specific examples illustrating variations in the dry cake mix compositions.

EXAMPLE I

This example illustrates variation in flour and starch compositions in the dry cake mix compositions.

A dry pre-mix was prepared of the following ingredients:

| Ingredients | Percent by Weight of the Final Dry Cake Mix Composition |
|---|---|
| Nuts | 8.25 |
| Non-fat milk solids | 4.00 |
| Salt | 0.85 |
| Sodium aluminum phosphate anhydrous monocalcium phosphate blend | 0.70 |
| Sodium bicarbonate | 0.60 |
| Flavoring | 0.30 |
| Coloring | 0.20 |
| | 14.90 |

This premix, 14.9 grams, was combined with 85.1 grams of the dry cake mix having the following proportions of shortening, sucrose, wheat flour and non-gelatinized wheat starch. The dry ingredients listed below and the premix were dry blended together and the shortening was blended into the mixture thereafter.

| Sample | Percentage of Dry Cake Mix Composition | | | |
|---|---|---|---|---|
| | Shortening* | Sucrose | Flour** | Starch |
| 1 | 20.3 | 40.6 | 29.7 | 7.9 |
| 2 | 21.4 | 46.9 | 25.5 | 4.7 |
| 3 | 20.8 | 43.3 | 26.2 | 8.1 |
| 4 | 19.1 | 42.1 | 27.5 | 9.8 |
| 5 | 20.9 | 43.3 | 26.2 | 8.1 |
| 6 | 21.2 | 46.6 | 25.3 | 5.4 |
| 7 | 21.1 | 48.9 | 26.1 | 2.3 |
| 8 | 21.3 | 46.9 | 25.5 | 4.7 |
| 9 | 21.1 | 49.6 | 24.9 | 2.9 |

*Shortening — vegetable
**Protein level —

The above samples were then rehydrated with 80 ml. of water and 100 grams of whole egg with 369 grams of the dry cake mix. The rehydration was accomplished with hand mixing.

A glaze mixture was prepared in the baking pan. The mixture was 30 grams of melted butter, 60 ml. of hot tap water and 95 grams of sucrose.

The cake batter was poured over the glaze mix. The combination was then baked for 32 minutes at 350°F. After baking, the cake pans were immediately inverted and the cakes evaluated after 30 minutes. The results are shown below:

| Sample | Evaluation |
|---|---|
| 1 | Acceptable |
| 2 | " |
| 3 | " |
| 4 | " |
| 5 | Excellent |
| 6 | Acceptable |
| 7 | Excellent |
| 8 | Acceptable |
| 9 | Poor |

EXAMPLE II

This example illustrates the effect of different protein levels of the wheat flour upon the final cake.

A dry cake mix was prepared by blending the following ingredients. The dry ingredients were blended and the shortening thereafter.

| Ingredient | Percentage of Total Dry Cake Mix Composition | Percentage of Composition of Basic Dry Mix |
|---|---|---|
| Sucrose regular grind* | 37.45 | 43.35 |
| Flour* | 22.65 | 26.42 |
| Shortening* | 18.00 | 20.97 |
| Nut meats | 8.25 | |
| Wheat starch, non-gelatinized* | 7.00 | |
| Non-fat milk solids | 4.00 | |
| Salt | 0.85 | |
| Blend of sodium aluminum phosphate and monocalcium phosphate* | 0.70 | 0.80 |
| Sodium bicarbonate | 0.66 | |
| Flavoring | 0.30 | |
| Coloring | 0.20 | |

*The shortening was a mixture of tallow and rearranged lard having the SFI shown in the specification Three samples were made up, baked and glazed using the procedure described in Example I. The protein level in the flour used in each sample is shown below. The results after evaluating the final cakes are also shown below.

| Sample | Protein Level | Evaluation of Final Cake |
|---|---|---|
| 1 | 10 | Normal glazed cake which was removed from the pan with ease. |
| 2 | 8 | Slightly greater than normal volume, stuck somewhat to the pan and had a small rim along the bottom edge, slightly more tender than Sample 1. |
| 3 | 10.9 | Heavy rim along edge, weak cake structure, dip in center, wet eating quality. |

The embodiments of the invention in which an exclusive property or privilege is claimed are defined as follows:

1. A dry cake mix consisting essentially of:
   about 22 to 30% wheat flour by weight of the dry cake mix composition, said wheat flour having a protein content of from about 8 to 10% by weight of the wheat flour,
   about 40 to 50% sucrose by weight of the dry cake mix composition,
   about 1 to 9% starch by weight of the dry cake mix composition, said starch being selected from wheat and corn starch,
   about 18 to 21% plastic shortening by weight of the dry mix composition, said shortening having a solid fat index of about:

| Temperature, °F. | SFI, % |
| --- | --- |
| 50 | 29–33 |
| 70 | 21–24 |
| 80 | 19–22 |
| 92 | 14–17 |
| 104 | 8–10 | and
   about 1 to 2% by weight of a slow-acting baking powder blend.

2. The composition of claim 1 wherein the wheat flour has a protein level of about 9 to 10% by weight of the dry cake mix composition.

3. The composition of claim 1 wherein non-fat dry milk solids are added up to an amount of 6% by weight of the dry cake mix composition.

4. The composition of claim 1 wherein cocoa is added up to an amount of 10% by weight of the dry cake mix composition.

5. The composition of claim 1 wherein non-gelatinized starch selected from wheat starch and corn starch is included in an amount of about 2 to 9% by weight of the dry cake mix composition.

6. The composition of claim 1 wherein gelatinized starch selected from wheat starch and corn starch is included in an amount of about 1 to 2% by weight of the dry cake mix composition.

* * * * *